United States Patent [19]

Nigol et al.

[11] 4,384,166
[45] May 17, 1983

[54] COULOMB-TYPE VIBRATION ABSORBER FOR SUSPENDED CABLES AND SUSPENDED CABLE COMBINED THEREWITH

[75] Inventors: Olaf Nigol, Etobicoke; Herbert J. Houston, Oakville, both of Canada

[73] Assignee: Slater Steel Industries Limited, Hamilton, Canada

[21] Appl. No.: 300,751

[22] Filed: Sep. 10, 1981

Related U.S. Application Data

[63] Continuation-in-part of Ser. No. 216,870, Dec. 16, 1980, abandoned.

[51] Int. Cl.³ .......................... H02G 7/14; H02G 7/12
[52] U.S. Cl. .......................................... 174/42; 174/146
[58] Field of Search .................................. 174/42, 146

[56] References Cited

U.S. PATENT DOCUMENTS 3,474,184  10/1969  Crosby et al. .................. 174/42
3,885,086  5/1975  Houston et al. ................. 174/42

Primary Examiner—Laramie E. Askin
Attorney, Agent, or Firm—Burgess, Ryan and Wayne

[57] ABSTRACT

A vibration absorber for attachment to suspended cables such as electrical transmission lines, to suppress vertical aeolian vibrations as well as horizontal subconductor oscillations. A clamp arm has one end attached to a suspended cable and another end rotatably coupled to a frame through two frictionally-engaged elements which provide coulomb friction when the clamp arm is caused to rotate relative to the frame as a result of said vibrations or oscillations. A separate resilient member couples the clamp arm to the frame to restore the initial orientation of the clamp arm.

14 Claims, 5 Drawing Figures

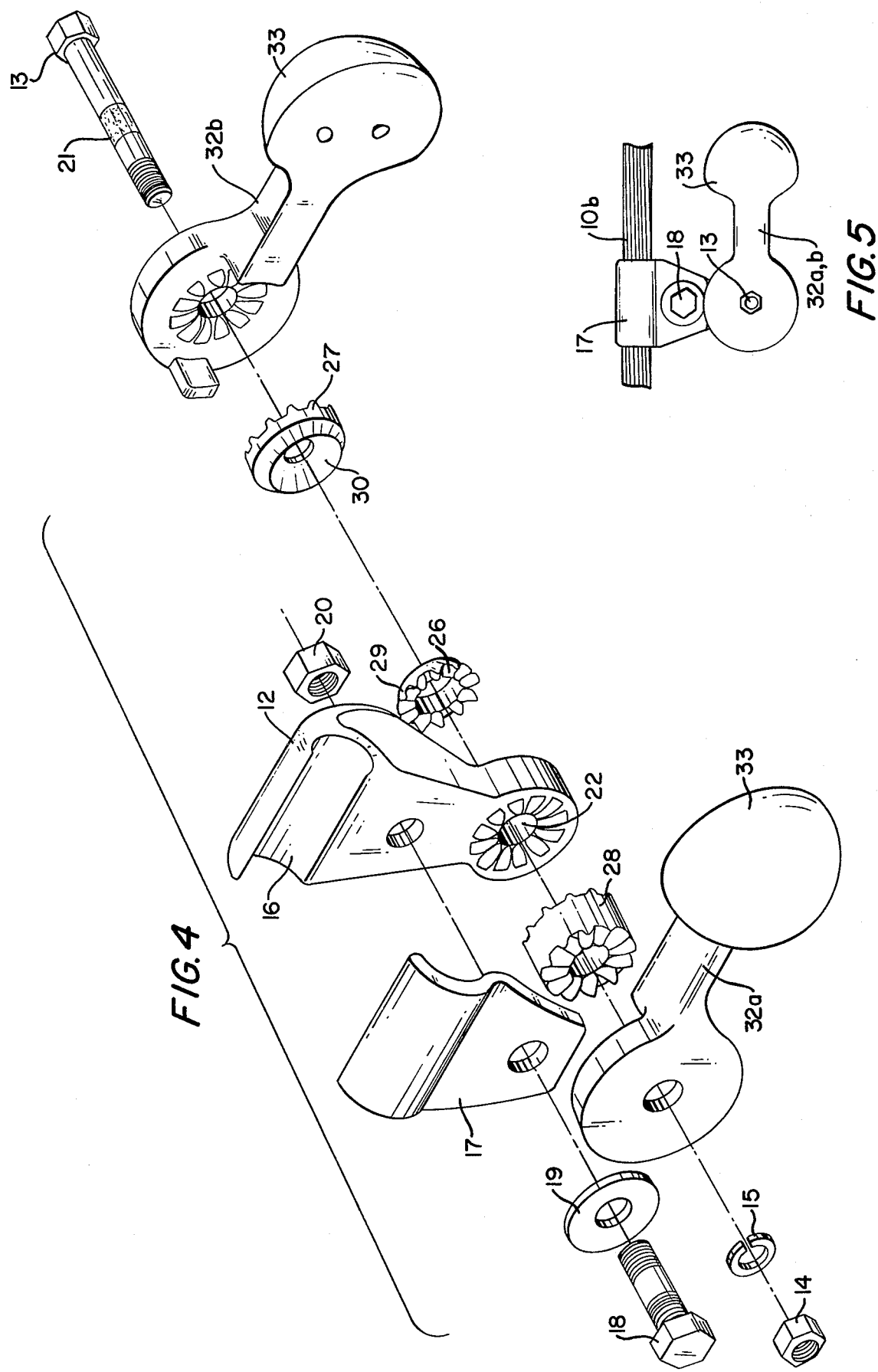

COULOMB-TYPE VIBRATION ABSORBER FOR SUSPENDED CABLES AND SUSPENDED CABLE COMBINED THEREWITH

This application is a continuation-in-part of co-pending application Ser. No. 216,870, filed Dec. 16, 1980, now abandoned, and assigned to the assignee of the instant application.

BACKGROUND OF THE INVENTION

This application is directed to an improved vibration absorber for suspended cables including but not limited to electrical transmission lines; and more specifically to a device for absorbing energy to suppress mechanical subspan oscillation and aeolian vibration of such cables.

The vibration absorber herein described operates on the principles disclosed in co-pending U.S. patent application Ser. No. 147,096, filed May 7, 1980, now U.S. Pat. No. 4,346,255, issued Aug. 24, 1982, assigned to the assignee of the present application and entitled OVERHEAD ELECTRICAL CONDUCTOR SYSTEM INCLUDING SUBSPAN OSCILLATION AND AEOLIAN VIBRATION ABSORBER FOR SINGLE AND BUNDLE CONDUCTORS. This prior application discloses and claims an essentially dissipative (as opposed to spring-type) vibration absorber, having a damping mechanical impedance which essentially matches the mechanical impedance of the transmission line to which the damper is attached. The acceptable range of damper impedance of the absorber is indicated as being anywhere between half and three times the transmission line mechanical impedance.

By essentially matching the transmission line mechanical impedance, and providing a dissipative (i.e., frequency independent) damping effect, the vibration absorber of the aforesaid U.S. patent application Ser. No. 147,096 provides optimum energy coupling between the transmission line and absorber, thus effectively absorbing travelling waves on the line before they build up to large amplitude standing waves which can cause damage to the line and associated supporting elements.

Until the aforesaid invention was made, prior art spring-type dampers had to be designed so that they operated effectively over the resonant frequency range of the transmission line to be damped. These dampers had to also be situated at points on the transmission line where standing waves would be of relatively large amplitude, i.e., at distances of a quarter wavelength from adjacent nodes.

The invention of U.S. patent application Ser. No. 147,096 relates to the use of vibration absorbers which can be connected to transmission lines to provide essentially dissipative damping. That is, these dampers utilize viscous-type effects, so that damping is essentially frequency independent. In contradistinction, those prior art dampers which utilized springs had undesirable resonance characteristics. A typical prior art vibration damper of this type is shown in U.S. Pat. No. 3,885,086. The vibration damper shown in this patent, however, is unsuitable for use in the arrangement contemplated by the aforementioned U.S. patent application Ser. No. 147,096, because it is incapable of providing the critical dissipative damping required. In U.S. Pat. No. 3,885,086, the annular washers 12 are situated between clamp arms 16 and adjacent frame portions 10, and secured thereto so that said washers do not rotate. The washers are of a resilient material, so that rotation of the clamp arm 16 results in deformation of the washers, the resilient characteristics of which then return the clamp arms to their initial orientations. In this arrangement, the only dissipative damping effects are provided by hysteresis losses within the resilient washers. Any attempt to increase the hysteresis losses by increasing the size of the washers, results in the spring force of the washers rising substantially faster than their hysteresis losses, making such a design impractical. Further, limitations of the resilient material itself make it impracticable to obtain sufficiently great hysteresis losses to provide critical dissipative damping. In addition, the hysteresis losses in the washers 12 are dependent upon both frequency and amplitude of vibration.

In contradistinction, dampers of U.S. patent application Ser. No. 147,096, being dissipative and therefore frequency-independent, need not be concerned with the resonant frequencies of the transmission line to which they are to be attached. Further, such dampers, being essentially impedance matched (i.e., within a range of half to three times the characteristic impedance of the transmission line to which they are to be attached), absorb travelling waves, so that they can be placed at any desired place on the transmission line to be damped.

Thus, there remains a need for an improved vibration absorber capable of being utilized according to the aforementioned principles.

Accordingly, an object of the present invention is to provide an improved vibration absorber in which the damping effect produced is essentially dissipative and therefore frequency-independent, and wherein the damping impedance is adjustable to a value capable of essentially matching the mechanical characteristic impedance of the cable to which the vibration absorber is connected.

SUMMARY

As herein described, there is provided a coulomb-type vibration absorber for suspended cables, comprising a frame, a first annular member secured to said frame and having an exposed frictional surface; a clamp body having a first portion for engaging a cable in a predetermined position and a second portion rotatably mounted to said frame for rotation of said clamp body about an axis generally parallel to said predetermined position of said cable; a second annular member secured to said second portion of said clamp body, and having an exposed frictional surface in rotating frictional engagement with said exposed frictional surface of said first annular member; resilient means for coupling said clamp body to said frame; and means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said resilient annular members.

IN THE DRAWING:

FIG. 4 is an exploded perspective view of a vibration absorber according to a second embodiment of the invention, for use with a single suspended cable; and FIG. 5 illustrates the connection of the vibration absorber shown in FIG. 4 to a suspended cable.

DETAILED DESCRIPTION

Figure 1:
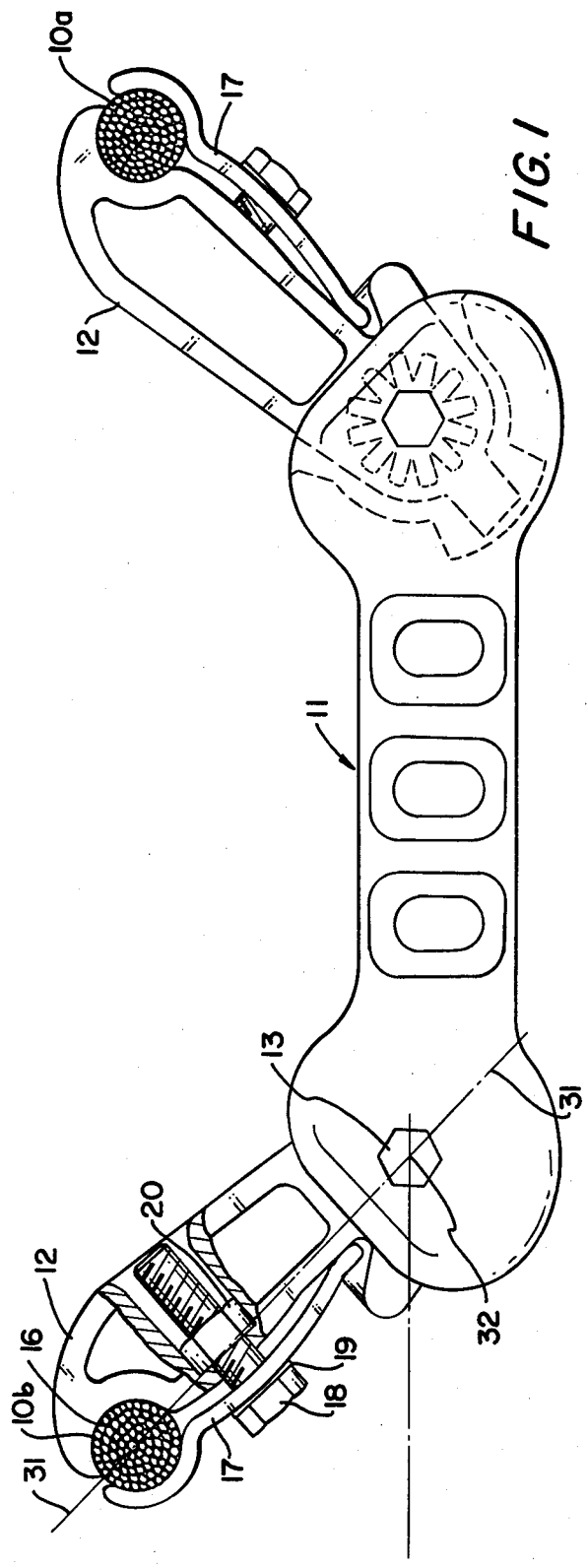
FIG. 1 is a front elevation view of a spacer damper type vibration absorber according to a first embodiment of the invention.

Aeolian vibration and sub-conductor oscillation derive their excitation from the minute forces associated with the release of vortices on the leeward side of conductors and cables when they are subjected to a steady air flow across their surfaces. It is believed that the excitation of aeolian vibration is derived from the detachment of the vortices and that sub-conductor oscillation is derived from the flow of the released vortices past the leeward conductor.

This release of vortices produces travelling waves which proceed along the span in opposite directions from their origin towards the suspension points. These waves in turn release other vortices to reinforce and amplify the wave motion. When the travelling wave arrives at the suspension point of the conductor, that is the attachment point of the conductor to the supporting structure, it is reflected with a 180° phase reversal due to the rigidity of the support point. The damping characteristics of the conductor and the suspension hardware are very small, so that attenuation of the travelling waves is also very small. This allows the travelling wave to make a large number of passes in a given span to thereby generate a standing wave having an amplitude of constant value, the amplitude being determined by the total damping of the system.

The aforementioned vibration phenomena may be avoided by preventing the formation of a standing wave rather than attempting to control the amplitude of the standing wave. Since it is not feasible to prevent vortex detachment, the present invention provides an absorber which will absorb the travelling wave and prevent its reflection back along the conductor. This is achieved by matching the dissipative impedance of the absorber with the characteristic mechanical impedance of the conductor.

The characteristic mechanical impedance of a conductor is defined as the ratio of force and velocity amplitudes of the travelling waves. Since the mechanical impedance of the conductor is a function of the tension in the conductor and the mass of the conductor per unit length, an absorber can be designed to match the mechanical impedance of the conductor for any given installation. Further, because the use of a dissipative damper for absorbing the wave does not require a frequency dependent resilient system, the absorber may be placed at any convenient location along the span of the conductor and not, as previously described, just at $\lambda/4$ wavepoints of the center aeolian frequency of the conductor.

Under ideal conditions where the absorber is installed at any point on the conductor, the absorber impedance R should be $k\sqrt{Tm}$, where T is the tension of the conductor, m is the mass of the conductor per unit length, and k is the damping factor which, under the aforementioned ideal conditions, equals 2.0 to reflect the fact that the conductor extends in both directions from the absorber. It has been found that significant improvements in vibration control may be achieved by selecting an absorber impedance or damping factor in the range of $0.5\sqrt{Tm}$ to $3\sqrt{Tm}$. Thus, increases in T and m due to icing of the conductors will not unduly affect the operation of the absorber.

This principle may be applied to sub-conductor oscillation by utilizing the inertial mass of other bundle conductors to provide support for the damping member. Thus, by arranging a rotary action type vibration absorber at an angle of 45° or at least in the range of 30° to 60° from the vertical and horizontal planes, it will absorb the travelling waves associated with the build-up of both vertical aeolian vibration and horizontal sub-conductor oscillation.

A spacer damper type vibration absorber which operates in the aforementioned manner, viz., by interconnection between two adjacent cables or bundle conductors 10a and 10b, is illustrated in FIG. 1 of the drawing. This spacer damper comprises a frame 11 having two opposed spaced-apart portions 11a and 11b.

A clamp arm 12 has an end portion for engaging the cable 10a, and another clamp arm 12 at the opposite end of the frame 11 similarly has an end portion for engaging cable 10b.

To avoid further confusion, further discussion will be confined to only one end of the frame 11 and its associated clamp arm 12.

The end of the clamp arm 12 remote from the cable 10a is rotatably mounted to the frame 11 by means of a bolt 13, secured in position by a nut 14 and a lock washer 15.

The end portion 16 of the clamp arm 12 comprises a longitudinal groove for receiving the cable 10b in a predetermined orientation generally parallel to the rotational axis of the clamp arm 12 as defined by the longitudinal axis of the bolt 13. A clamp keeper 17 cooperates with the clamp arm 12 to retain the cable 10 in position, the clamp keeper 17 being urged toward the clamp arm 12 by means of bolt 18, flat washer 19, and nut 20.

To prolong the life of the vibration absorber by minimizing wear, a cylindrical portion of the surface of the bolt 13 is provided with a nylon or other low-friction plastic coating 21 in the region where the bolt 13 passes through a hole 22 in the clamp arm 12 extending between major surfaces 23 and 24 thereof.

Figure 3:
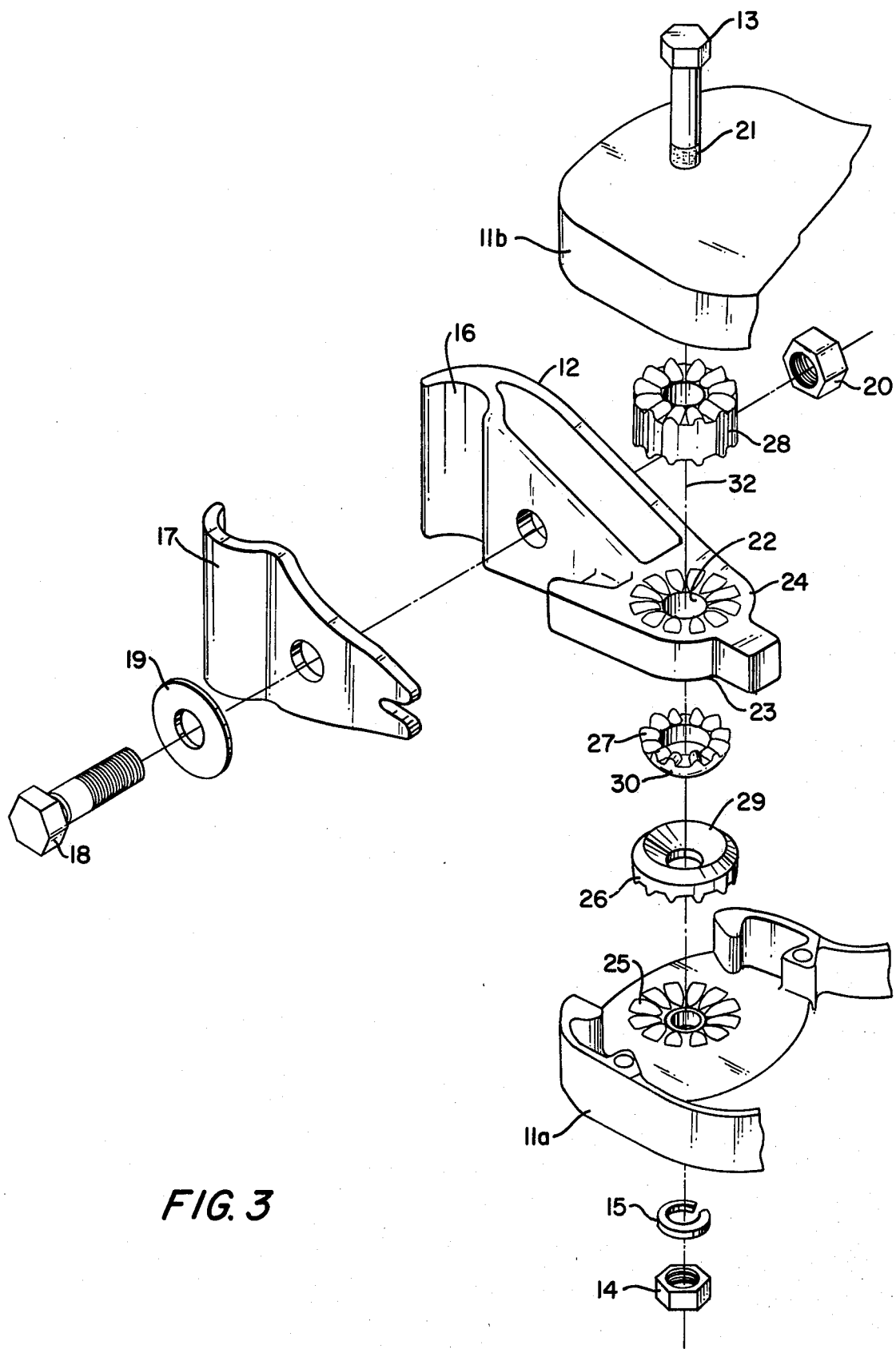
FIG. 3 is an exploded perspective view of the left hand portion of said vibration absorber.

Holes through the frame portions 11a and 11b are surrounded by peripheral recesses, only the recesses 25 in the frame portion 11a being visible in FIG. 3. Similarly, the major surfaces 23 and 24 of the clamp arm 12 have peripheral recesses therein surrounding the hole 22.

A first washer 26 is disposed in contact with the frame portion 11a, and prevented from rotating with respect thereto by engagement of peripheral protuberances thereon with the recesses 25 of the frame portion 11a. Similarly, an annular washer 27 is disposed adjacent the major surface 23 of the clamp arm 12 and prevented from rotating with respect thereto by engagement of peripheral protuberances of the washer 27 with corresponding recesses on the surface 23.

A third annular resilient washer 28 is disposed between the surface 24 of the clamp arm 12 and the adjacent surface of the frame portion 11b, and prevented from rotating with respect to either of said surfaces by engagement of corresponding protuberances of the washer 28 with mating recesses in said surfaces.

The resilient washer 28 comprises a suitable durable resilient material such as polyisoprene, an elastomeric polymer. Other suitable elastomeric polymers may of course be employed for this purpose. The washers 26 and 27 are usually of rigid low friction coefficient material but could also be of resilient material, with low friction coefficient surfaces.

The washer 26 has a conical recess 29 therein comprising an exposed frictional surface; and the washer 27 has a mating conical projection 30 comprising a second exposed frictional surface. The frictional surfaces 29 and 30 rotatably engage each other so that coulomb frictional forces are generated therebetween upon rotation of the clamp arm 12 with respect to the frame portion 11a.

Rotation of the clamp arm 12 with respect to the frame portion 11b is resisted by the spring action of the resilient washers 28, which acts to restore the clamp arm 12 to its initial or "neutral" position with respect to the frame 11 after the clamp arm 12 has been deflected by aeolian vibration or sub-conductor oscillation forces.

Dissipative energy losses occur primarily as a result of coulomb friction between the exposed frictional surfaces 29 and 30, losses due to hysteresis in the washer 28 being relatively small in comparison therewith.

The amount of coulomb force or frictional force, i.e., the dissipative damping factor of the spacer damper, may be adjusted by varying the normal force between the exposed frictional surfaces 29 and 30 by tightening or loosening the bolt 13 and nut 14 accordingly, such adjustments having relatively little effect upon the torsional spring action of the washer 28.

By appropriately selecting the contact area between the surfaces 29 and 30 and adjusting the normal force therebetween, dissipative damping factors in the aforementioned desired range of $0.5\sqrt{Tm}$ to $3.0\sqrt{Tm}$ can be obtained.

Preferably, the material and surface texture of the exposed frictional surfaces 29 and 30 should be such that the coefficient of static friction therebetween is on the order of (i.e., within 25% of) the coefficient of moving or kinetic friction therebetween. For best results, said coefficients should be essentially equal.

As best seen in FIG. 1, for equal response to vertical aeolian vibrations and horizontal sub-conductor oscillations, the spacer-damper should be constructed and positioned such that a line 31 normal to and intersecting the axis 32 of rotation of the clamp arm 12 about the frame 11 and the cable 10b, makes an angle of 45° with respect to the horizontal. For a particular application where enhanced response to either vertical or horizontal movement of the cable 10b is desired, the aforementioned angle can be varied in the range of 30° to 60°.

With the aforementioned arrangement, the engagement of the exposed frictional surfaces 29 and 30 provides damping not only for the vibrations and oscillations of the cable 10b, but also for the resilient washer 28.

The spacer damper described above may be installed on an electrical transmission line at unequal spacings, i.e., with the distance between adjacent spacer-damper units being different in adjacent sub-spans of the suspended cables, so that any two adjacent sub-spans would have a different response frequency to sub-conductor oscillation. The spacer-dampers act as gates under these conditions, dumping energy from the responding sub-span into the adjacent spans. Because of the different response frequencies of the adjacent spans, efficient energy absorption is thus attained.

Figure 2:
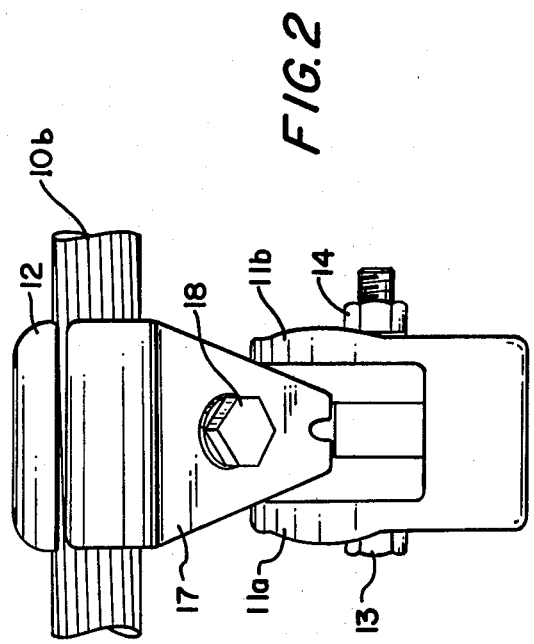
FIG. 2 is a right side elevation view of said vibration absorber.

FIGS. 4 and 5 illustrate a second embodiment of the invention, suitable for use in damping a single suspended cable. In this embodiment, the coulomb friction surfaces 29 and 30 and related elements function in exactly the same manner as previously described with respect to the spacer-damper of FIGS. 1 to 3.

However, instead of having a frame with symmetrical end portions with corresponding clamp arms rotatably mounted thereto, the arrangement of FIGS. 4 and 5 employs a somewhat different frame having frame portions 32a and 32b. One end of the frame has a clamp arm 12 rotatably mounted thereto, with an associated structure similar to that illustrated in FIG. 3. The other ends of the frame portions cooperate to comprise a weight 33 which provides sufficient inertia so that movement of the cable 10b, as best seen in FIG. 5, results in rotation of the clamp arm 12 with respect to the frame 32a/32b and therefore coulomb damping by means of frictional engagement of the surfaces 29 and 30.

In most cases it will be practicable only to mount the frame 32a/32b directly below the associated conductor 10b, so that the vibration absorber of FIGS. 4 and 5 is effective primarily for suppression of vertical aeolian vibration, and does little to suppress horizontal sub-conductor oscillations.

What is claimed is:

1. In combination,
   a suspended cable having a mechanical characteristic impedance given by $\sqrt{Tm}$, where T is the cable tension and m is the cable mass per unit length; and
   a coulomb-type vibration absorber for said cable, comprising:
   a frame having two opposed spaced-apart portions;
   a first annular member secured to one of said frame portions and having an exposed frictional surface;
   a clamp body having a first portion engaging said cable in a predetermined position and a second portion rotatably mounted to said frame for rotation of said clamp body about an axis generally parallel to said predetermined position of said cable, said second portion of said clamp body having first and second opposed major surfaces;
   a second annular member secured to said first major surface and having an exposed frictional surface remote from said first major surface and in rotating frictional engagement with said exposed frictional surface of said first annular member;
   a third annular member secured to said second major surface and to the other of said frame portions and disposed therebetween, said third annular member comprising a resilient material; and
   means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said resilient annular member, with a damping factor equal to $k\sqrt{Tm}$, where $0.5 \leq k \leq 3$.

2. In combination,
   a suspended cable having a mechanical characteristic impedance given by $\sqrt{Tm}$, where T is the cable tension and m is the cable mass per unit length; and
   a coulomb-type vibration absorber for said cable, comprising:
   a frame;
   a first annular member secured to said frame and having an exposed frictional surface;

a clamp body having a first portion engaging said cable in a predetermined position and a second portion rotatably mounted to said frame for rotation of said clamp body about an axis generally parallel to said predetermined position of said cable;

a second annular member secured to said second portion of said clamp body, and having an exposed frictional surface in rotating frictional engagement with said exposed frictional surface of said first annular member;

a third annular member secured to said second portion of said clamp body and to said frame and disposed therebetween, said third annular member comprising a resilient material, said second portion of said clamp body being disposed between said second and third annular members; and means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said resilient annular members, with a damping factor equal to $k\sqrt{Tm}$, where $0.5 \leq k \leq 3$.

3. In combination, a suspended cable having a mechanical characteristic impedance given by $\sqrt{Tm}$, where T is the cable tension and m is the cable mass per unit length; and a coulomb-type vibration absorber for said cable, comprising:

a frame;

a first annular member secured to said frame and having an exposed frictional surface;

a clamp body having a first portion engaging said cable in a predetermined position and a second portion rotatably mounted to said frame for rotation of said clamp body about an axis generally parallel to said predetermined position of said cable;

a second annular member secured to said second portion of said clamp body, having an exposed frictional surface in rotating frictional engagement with said exposed frictional surface of said first annular member;

resilient means coupling said clamp body to said frame; and means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said resilient means, with a damping factor equal to $k\sqrt{Tm}$, where $0.5 \leq k \leq 3$.

4. The combination according to claim 1, 2, or 3, wherein said axis is situated with respect to said cable so that a line normal to and intersecting said axis and cable is oriented at an angle of approximately 45° with respect to the horizontal.

5. The combination according to claim 1 or 2, wherein said third annular member comprises a resilient elastomeric polymer.

6. The combination according to claim 5, wherein said polymer comprises polyisoprene.

7. The combination according to claim 1, 2 or 3, wherein said adjusting means comprises a bolt extending along said axis through said frame, members and clamp body and a nut threadably attached to said bolt.

8. The combination according to claim 7, further comprising a layer of low friction coefficient plastic material surrounding said bolt adjacent said clamp body.

9. The combination according to claim 1, 2 or 3, wherein the coefficient of static friction between said exposed frictional surfaces is on the same order as the coefficient of kinetic friction therebetween.

10. The combination according to claim 9, wherein said friction coefficients are substantially equal to each other.

11. The combination according to claim 1, 2 or 3, further comprising means including another dissipative damping means for attaching a portion of said frame remote from said first portion of said clamp body to another cable.

12. The combination according to claim 1, 2 or 3, further comprising a weight secured to said frame at a position remote from said axis.

13. The combination according to claim 1, 2 or 3, wherein a plurality of identical ones of said vibration absorbers are mounted on adjacent subspans of said suspended cable, with the distance between adjacent vibration absorbers of one of said subspans being different from the distance between adjacent vibration absorbers of an adjacent subspan, so that said subspans have a different response frequency to subconductor oscillation.

14. A coulomb-type vibration absorber for suspended cables, comprising:

a frame having two opposed spaced-apart portions;

a first annular member secured to one of said frame portions and having an exposed frictional surface;

a ~~clamp body~~ having a first portion for engaging a cable in a predetermined position and a second portion rotatably mounted to said frame for rotation of said clamp body about an axis generally parallel to a predetermined position of a cable, said second portion of said clamp body having first and second opposed major surfaces;

a second annular member secured to said first major surface and having an exposed frictional surface remote from said first major surface and in rotating frictional engagement with said exposed frictional surface of said first annular member, the coefficient of static friction between said exposed frictional surfaces being substantially equal to the coefficient of kinetic friction therebetween;

a third annular member secured to said second major surface and to the other of said frame portions and disposed therebetween, said third annular member comprising a resilient material; and means for adjusting the coulomb frictional force between said exposed frictional surfaces, said adjusting means comprising a bolt extending along said axis through said frame portions, members and clamp body and a nut threadably attached to said bolt, said frictional force generating frictional losses upon vibration of a cable which substantially exceed any hysteresis losses within said annular members, so that the coulomb frictional force between said first and second annular members provides dissipative damping for both a cable and said resilient annular member.

* * * * *